United States Patent
Li et al.

(10) Patent No.: US 9,797,358 B2
(45) Date of Patent: Oct. 24, 2017

(54) SYSTEM AND METHOD FOR CONTROLLING AN ENGINE TO REMOVE SOOT DEPOSITS FROM THE FUEL INJECTORS OF THE ENGINE

(71) Applicant: GM Global Technology Operations LLC, Detroit, MI (US)

(72) Inventors: Sharon Xiaobin Li, Bloomfield Hills, MI (US); Robert S. Levy, Leonard, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 132 days.

(21) Appl. No.: 14/958,013

(22) Filed: Dec. 3, 2015

(65) Prior Publication Data

US 2017/0159630 A1 Jun. 8, 2017

(51) Int. Cl.
| F02D 41/30 | (2006.01) |
| F02M 65/00 | (2006.01) |
| F02D 37/02 | (2006.01) |
| F02P 5/04 | (2006.01) |
| F02D 41/40 | (2006.01) |

(52) U.S. Cl.
CPC ........... F02M 65/008 (2013.01); F02D 37/02 (2013.01); F02D 41/3005 (2013.01); F02D 41/3076 (2013.01); F02D 41/402 (2013.01); F02P 5/045 (2013.01); *F02D 2250/38* (2013.01)

(58) Field of Classification Search
CPC .. F02D 41/3076; F02D 41/402; F02D 41/403; F02D 41/405; F02D 2200/0812; F02D 2250/38; F02M 53/06; F02M 65/007; F02M 65/008

USPC .................................. 123/299, 467, 406.47
See application file for complete search history.

(56) References Cited

U.S. PATENT DOCUMENTS

| 5,740,045 | A | 4/1998 | Livshiz et al. |
| 6,691,676 | B2 | 2/2004 | Konno |
| 6,892,691 | B1 * | 5/2005 | Uhl ......................... F02B 77/04 |
| | | | 123/198 A |
| 8,794,214 | B2 * | 8/2014 | Odendall ............ F02B 23/0663 |
| | | | 123/198 A |
| 8,989,989 | B2 | 3/2015 | Sczomak et al. |
| 9,435,307 | B2 * | 9/2016 | Ikemoto ............. F02M 61/1806 |
| 9,441,569 | B2 * | 9/2016 | Skipp .................. F02D 41/3005 |

(Continued)

FOREIGN PATENT DOCUMENTS

| JP | 2009103106 A | 5/2009 |
| JP | 2012117414 A | 6/2012 |

OTHER PUBLICATIONS

U.S. Appl. No. 14/520,699, filed Oct. 22, 2014, Levy et al.

(Continued)

*Primary Examiner* — Erick Solis

(57) ABSTRACT

A system according to the principles of the present disclosure includes a fuel injector cleaning module and a fuel control module. The fuel injector cleaning module generates an instruction to clean a fuel injector of an engine based on engine operating conditions. The fuel control module, in response to the injector clean instruction, controls the fuel injector to perform N fuel injections for each combustion event in a cylinder of the engine and, during each of the N fuel injections, deactivates the fuel injector before the fuel injector fully opens. N is an integer greater than one.

24 Claims, 4 Drawing Sheets

(56) References Cited

U.S. PATENT DOCUMENTS

| | | |
|---|---|---|
| 2002/0107633 A1 | 8/2002 | Iwasaki et al. |
| 2003/0084861 A1 | 5/2003 | Machida |
| 2005/0028782 A1* | 2/2005 | Britsch ............... F02D 41/402 |
| | | 123/299 |
| 2009/0100921 A1 | 4/2009 | McLain et al. |
| 2010/0057283 A1 | 3/2010 | Worthing et al. |
| 2010/0070158 A1* | 3/2010 | Futonagane ........... F02M 45/02 |
| | | 701/105 |
| 2010/0292909 A1 | 11/2010 | Gwidt et al. |
| 2011/0246048 A1 | 10/2011 | Fujii et al. |
| 2013/0080031 A1 | 3/2013 | Knoebel et al. |
| 2013/0139768 A1 | 6/2013 | Takemoto |
| 2014/0074381 A1 | 3/2014 | Sczomak et al. |
| 2015/0275723 A1* | 10/2015 | Koch ................. F02D 13/0249 |
| | | 60/605.2 |

OTHER PUBLICATIONS

JP2009103106A (Ashizawa, Takeshi) May 14, 2009 (machine translation). [online] [retrieved on Aug. 3, 2014]. Retrieved from: JPO using internet <URL: <http://www.ipdl.inpit.go.jp/homepg_e.ipdl>.

\* cited by examiner

SYSTEM AND METHOD FOR CONTROLLING AN ENGINE TO REMOVE SOOT DEPOSITS FROM THE FUEL INJECTORS OF THE ENGINE

FIELD

The present disclosure relates to internal combustion engines, and more specifically, to systems and methods for controlling an engine to remove soot deposits from the fuel injectors of the engine.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which generates drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

As an engine combusts air and fuel to generate drive torque, the engine produces particulates that pass into an exhaust system of the engine along with other emissions. Particulates include soot or smoke made up of micrometer-sized particles. The amount of particulates released into the atmosphere may be reduced by including a particulate filter in the exhaust system of the engine. However, particulate filters are costly and increase exhaust back pressure.

SUMMARY

A system according to the principles of the present disclosure includes a fuel injector cleaning module and a fuel control module. The fuel injector cleaning module generates an instruction to clean a fuel injector of an engine based on engine operating conditions. The fuel control module, in response to the injector clean instruction, controls the fuel injector to perform N fuel injections for each combustion event in a cylinder of the engine and, during each of the N fuel injections, deactivates the fuel injector before the fuel injector fully opens. N is an integer greater than one.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

There are three main reasons that an engine produces particulates. First, fuel injected into a cylinder of the engine may impinge and stick to a surface of a combustion chamber in the cylinder. The likelihood of fuel impingement may be greater when the combustion chamber surface is cool. Second, fuel may mix poorly with air, causing local areas within the cylinder to have a rich air-fuel equivalence ratio (e.g., less than 0.7). Third, fuel that remains on the surface of a fuel injector tip yields a flame, which leaves carbon deposits on the injector tip. In turn, the amount of particulates produced due to carbon deposits on the injector tip typically increases over time. This increase may be referred to as injector drift.

A system and method according to the present disclosure limits injector drift by periodically cleaning fuel injectors of an engine. The system and method cleans the fuel injectors by increasing the pressure of fuel supplied to the fuel injectors and controlling the fuel injectors to perform multiple (e.g., 3) short pulses for each combustion event. Due to the short duration of the pulses, the fuel injectors are deactivated before the fuel injectors fully open. Such short pulses may be referred to as ballistic pulses.

Controlling a fuel injector to perform multiple high pressure ballistic pulses per combustion event removes soot deposits inside spray holes of the fuel injector, presumably due to induced cavitation and/or turbulence in a main spray hole of the fuel injector. Removing soot deposits from fuel injectors of an engine decreases the amount of particulates produced by the engine. Thus, the amount of particulates produced by an engine may be decreased by cleaning fuel injectors to limit injector drift instead of using a particulate filter to capture the particulates.

The system and method may also clean the fuel injectors by advancing spark timing. Advancing the spark timing decreases the period from the time when fuel is injected in to a cylinder to the time when spark is generated in the cylinder. In turn, fuel may be combusted when the fuel is still at or near the injector tip, which may increase the surface temperatures around the injector tip and thereby burn off surface deposits.

Figure 1:
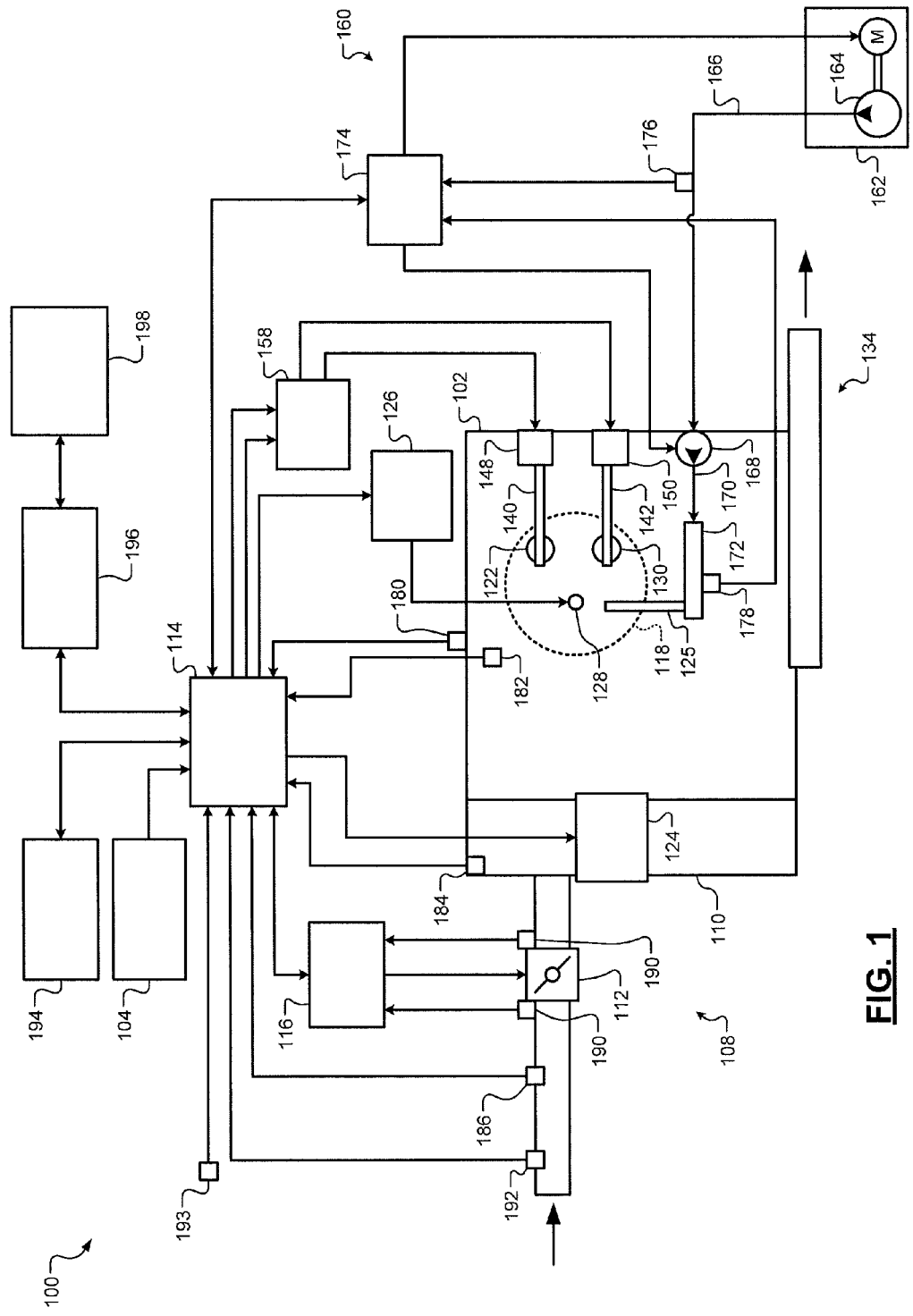
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls an injector actuator module 124, which regulates a fuel injector 125 to achieve a desired air/fuel ratio. The fuel injector 125 may inject fuel into the intake manifold 110 at a central location or at multiple locations, such as near the intake valve 122 of each of the cylinders. In various implementations, the fuel injector 125 may inject fuel directly into the cylinders, as shown in FIG. 1, or into mixing chambers associated with the cylinders. The injector actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148 and 150 based on signals from the ECM 114. When implemented, variable valve lift may also be controlled by the valve actuator module 158.

The ECM 114 may deactivate the cylinder 118 by instructing the valve actuator module 158 to disable opening of the intake valve 122 and/or the exhaust valve 130. The valve actuator module 158 may disable opening of the intake valve 122 by decoupling the intake valve 122 from the intake camshaft 140. Similarly, the valve actuator module 158 may disable opening of the exhaust valve 130 by decoupling the exhaust valve 130 from the exhaust camshaft 142. In various implementations, the valve actuator module 158 may control the intake valve 122 and/or the exhaust valve 130 using devices other than camshafts, such as electromagnetic or electrohydraulic actuators.

A fuel system 160 provides fuel to the fuel injector 125 for delivery to the cylinders. The fuel system 160 includes a fuel tank 162, a low pressure pump 164, a first fuel line 166, a high pressure pump 168, a second fuel line 170, and a fuel rail 172. The fuel injector 125 may also be considered part of the fuel system 160. In addition, one or more components of the fuel system 160, such as the fuel injector 125 and/or the high pressure pump 168, may be considered part of the engine 102. The low pressure pump 164 delivers fuel from the fuel tank 162 to the high pressure pump 168 through the first fuel line 166. The low pressure pump 164 may be an electric pump.

The high pressure pump 168 pressurizes fuel from the first fuel line 166 and delivers the pressurized fuel to the fuel rail 172 through the second fuel line 170. The high pressure pump 168 may be driven by the intake camshaft 140, the exhaust camshaft 142, or another driving mechanism such as the crankshaft. The fuel rail 172 distributes the pressurized fuel to one or more fuel injectors of the engine 102, such as the fuel injector 125.

The ECM 114 controls a pump actuator module 174, which regulates the output of the low pressure pump 164 and the high pressure pump 168 to achieve a desired pressure in the first fuel line 166 and the fuel rail 172, respectively. A low side fuel pressure (LFP) sensor 176 measures the pressure of fuel in the first fuel line 166, which may be referred to as a low side pressure. A high side fuel pressure (HFP) sensor 178 measures the pressure of fuel in the fuel rail 172, which may be referred to as a high side pressure. The LFP sensor 176 and the HFP sensor 178 may provide the low side pressure and the high side pressure to the pump actuator module 174, which in turn may provide the low side pressure and the high side pressure to the ECM 114. Alternatively, the LFP sensor 176 and the HFP sensor 178 may provide the low side pressure and the high side pressure directly to the ECM 114.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, the difference between ambient air pressure and the pressure within the intake manifold 110 may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The speed of the vehicle propelled by the engine 102 may be measured using a vehicle speed (VS) sensor 193. The ECM 114 uses signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198. The electric motor 198 may also function as a generator, and may be used to produce electrical energy for use by the vehicle's electrical systems and/or for storage in a battery. In various implementations, various functions of the ECM 114, the TCM 194, and the HCM 196 may be integrated into one or more modules.

Figure 2:
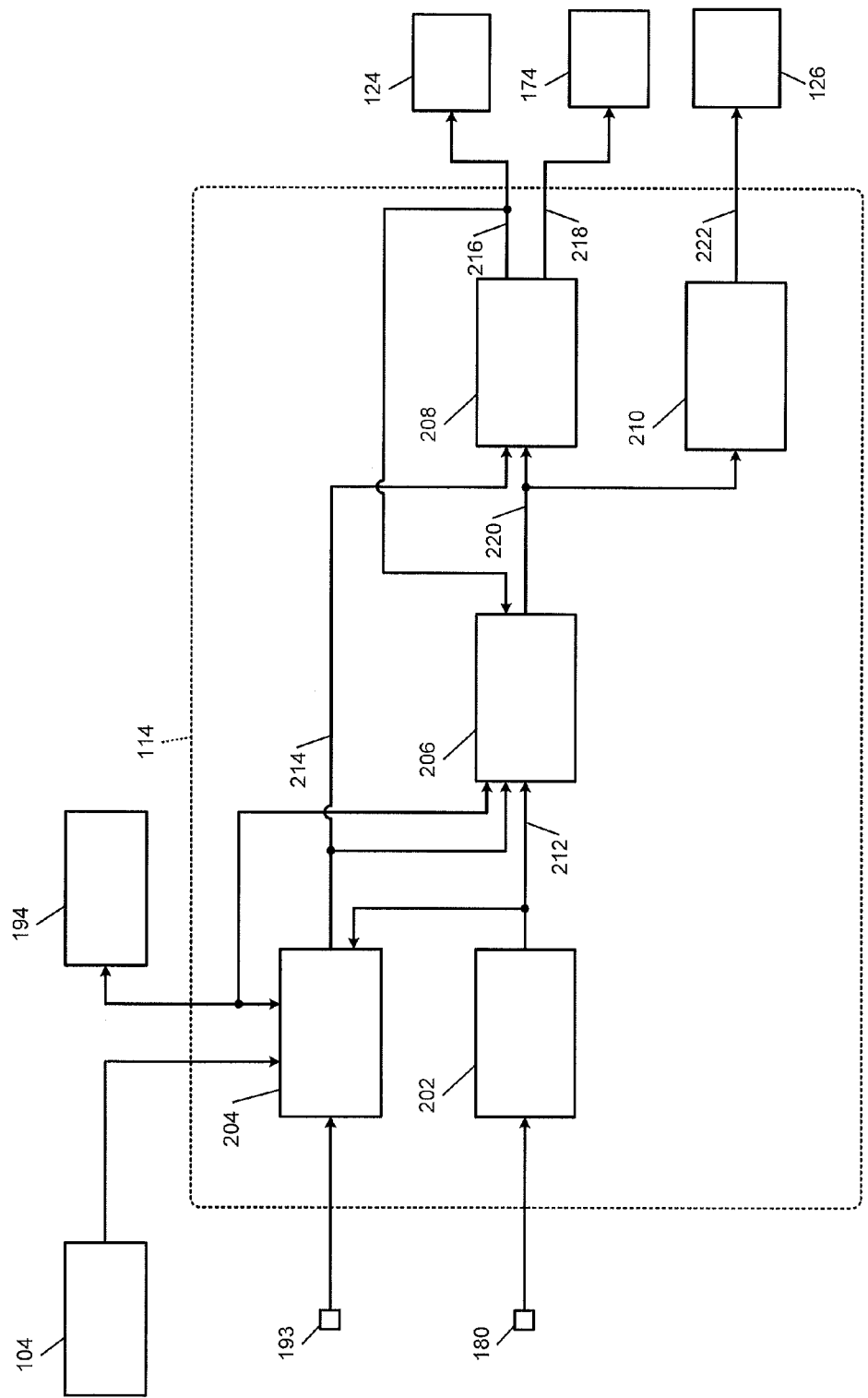
FIG. 2 is a functional block diagram of an example control system according to the principles of the present disclosure.

Referring now to FIG. 2, an example implementation of the ECM 114 includes an engine speed module 202, a deceleration fuel cutoff (DFCO) module 204, a fuel injector cleaning module 206, a fuel control module 208, and a spark control module 210. The engine speed module 202 determines the speed of the engine 102 based on the crankshaft position from the CKP sensor 180. For example, the engine speed module 202 may calculate the engine speed based on a period that elapses as the crankshaft completes one or more revolutions. The engine speed module 202 generates an engine speed signal 212 indicating the engine speed.

The DFCO module 204 stops fuel delivery to one or more (e.g., all) cylinders of the engine 102 when the vehicle is decelerating or coasting and the accelerator pedal is not depressed. The act of stopping fuel delivery to the cylinders of the engine 102 may be referred to as deceleration fuel cutoff. The DFCO module 204 determines whether the vehicle is decelerating or coasting based on the vehicle speed from the VS sensor 193. The DFCO module 204 determines whether the accelerator pedal is depressed based on the driver input from the driver input module 104.

The DFCO module 204 may ensure that additional conditions are satisfied before stopping fuel delivery to the cylinders. In one example, the DFCO module 204 may not stop fuel delivery to the cylinders unless the engine 102 is coupled to the transmission, the transmission is in gear, and/or the engine speed is greater than an idle speed. The DFCO module 204 may determine whether the engine 102 is coupled to the transmission and the transmission is in gear based on an input from the TCM 194. In another example, the DFCO module 204 may not stop fuel delivery to the cylinders when purge vapor is being delivered to the cylinders, when a catalyst temperature is less than an activation temperature, and/or when a diagnostic is being performed.

The DFCO module 204 stops fuel delivery to the cylinders by sending a DFCO instruction signal 214 to the fuel control module 208. The DECO module 204 restarts fuel delivery to the cylinders when the conditions required for deceleration fuel cutoff to be performed are no longer satisfied.

The fuel control module 208 controls fuel delivery to the cylinders by instructing the fuel actuator module 124 to achieve a desired air/fuel ratio. The fuel control module 208 may adjust the number of fuel injections per combustion event, the amount of fuel injected in each injection, and the injection timing by sending an injector control signal 216 to the injector actuator module 124. The fuel control module 208 adjusts the pressure of fuel in the fuel rail 172 by sending a pump control signal 218 to the pump actuator module 174.

The fuel injector cleaning module 206 determines when to clean fuel injectors of the engine 102 based on operating conditions of the engine 102. For example, the fuel injector cleaning module 206 may determine that cleaning the fuel injectors is desired when (e.g., each time that) the DFCO module 204 determines that the conditions for deceleration fuel cutoff are satisfied. The fuel injector cleaning module 206 generates an injector clean signal 220 instructing the fuel control module 208 to clean the fuel injectors. In response, the fuel control module 208 may postpone or delay deceleration fuel cutoff while controlling the fuel injectors as described below in order to clean the fuel injectors. The fuel injector cleaning module 206 may generate the injector clean signal 220 each time that the DECO module 204 determines that the conditions for deceleration fuel cutoff are satisfied.

In various implementations, the fuel injector cleaning module 206 may generate the injector clean signal 220 at predetermined operating intervals of the engine. For example, the fuel injector cleaning module 206 may generate the injector clean signal 220 when a period that the engine 102 has operated since the injector clean signal 220 was last generated is greater than or equal to a predetermined period (e.g., 2 hours). The fuel injector cleaning module 206 may determine that the engine 102 is operating when the engine speed is greater than or equal to a predetermined speed (e.g., 500 revolutions per minute).

In various implementations, the fuel injector cleaning module 206 may generate the injector clean signal 220 when the rate of fuel flow through one or more fuel injectors of the engine decreases by at least a predetermined amount. The fuel injector cleaning module 206 may determine the amount by which the rate of fuel flow through the fuel injectors decreases based on the injector control signal 216. For example, at a given intake air flow and fuel rail pressure, the fuel control module 208 may command a larger pulse width for a fuel injector as a difference between a target A/F ratio and an actual A/F ratio increases to compensate for soot deposits in the fuel injector. Thus, the fuel injector cleaning module 206 may determine the amount by which fuel flow through the fuel injector has decreased based on the amount by which the pulse width is increased.

In various implementations, the fuel injector cleaning module 206 may generate the injector clean signal 220 when the transmission is shifting gears and/or when the transmission is decoupled from the engine 102. The fuel injector cleaning module 206 may determine when the transmission is shifting gears and/or when the transmission is decoupled from the engine 102 based on an input from the TCM 194. Additionally or alternatively, the fuel injector cleaning module 206 may generate the injector clean signal 220 during normal operation of the engine 102. In response, the fuel control module 208 may clean the fuel injectors by controlling the fuel injectors to perform multiple injection pulses as described below in addition to controlling the fuel injectors to perform regular injection pulses.

The fuel control module 208 may clean the fuel injectors by increasing the pressure of fuel in the fuel rail 172 and controlling the fuel injectors to perform multiple (e.g., three) injection pulses during each injection cycle and/or for each combustion event. The fuel control module 208 may increase the pressure of fuel in the fuel rail 172 to a predetermined pressure (e.g., 35 megapascals), which may correspond to a maximum capacity of the high pressure pump 168. An injection cycle refers to a crank angle range during which a fuel injector of the engine 102 injects fuel into a cylinder, or into a mixing chamber associated with the cylinder, when fuel delivery to the cylinder is not cutoff. Thus, for an 8-cylinder engine having 8 fuel injectors that each inject fuel at least one during two revolutions (720 degrees) of crankshaft rotation, the injection cycle of each fuel injector may correspond to 90 degrees of crankshaft rotation.

When controlling the fuel injectors to perform multiple injection pulses during each injection cycle and/or for each combustion event, the fuel control module 208 may adjust the pulse width and/or the dwell time of the fuel injectors. Pulse width refers to a period during which a fuel injector is activated by, for example, supplying power to the fuel injector. Dwell time refers to a period during which a fuel injector is deactivated by, for example, not supplying power to the fuel injector.

During normal operation, the fuel control module 208 may adjust the pulse width to at least 1.2 milliseconds (ms) or 1.3 ms and adjust the dwell time to at least 3.5 ms. However, when cleaning the fuel injectors, the fuel control module 208 may decrease the pulse width and the dwell time to corresponding minimum values dictated by the capacity of the fuel injectors. For example, the fuel control module 208 may decrease the pulse width to a value between 0.5 ms and 0.8 ms (e.g., 0.6 ms) and decrease the dwell time to a value between 0.2 ms and 1.2 ms (e.g., 0.5 ms).

Due to the shortened pulse width, the fuel control module 208 may deactivate the fuel injectors before the fuel injectors fully open. For example, the rate of fuel flow through the fuel injectors relative to a maximum flow rate capacity of the fuel injectors may be between 30 percent and 50 percent when the fuel injectors are deactivated. In addition, due to the shortened dwell time, the fuel control module 208 may reactivate the fuel injectors before the fuel injectors fully close. For example, the rate of fuel flow through the fuel injectors relative to a maximum flow rate capacity of the fuel injectors may be between 0 percent and 10 percent when the fuel injectors are reactivated. Thus, the multiple injection pulses that are performed in response to the injector clean signal 220 may be referred to as ballistic injection pulses.

The spark control module 210 controls spark plugs of the engine 102 by generating a spark control signal 222 indicating a desired spark timing. The spark actuator module 126 receives the spark control signal 222 and energizes the spark plugs according to the desired spark timing. The spark control module 210 may advance spark timing in response to the injector clean signal 220 to increase surface temperatures at and around the fuel injector tips and thereby burn off surface deposits. In addition, the spark control module 210 may command multiple (e.g., 2) sparks for a single combustion event in response to the injector clean signal 220 to prevent the engine 102 from misfiring due to multiple injection pulses during an injector cleaning.

The advanced spark timing brings the spark timing closer to the injection timing so that spark is generated in cylinders of the engine 102 just after fuel is injected. For example, fuel injections into a cylinder may start between 7 degrees and 12 degrees (e.g., 10 degrees) of crankshaft rotation before spark is generated in the cylinder. As a result, fuel may still be at or near the injector tips when the fuel is burned, which increases surface temperatures at the injector tips and burns off surface deposits.

The fuel control module 208 may maintain the fuel rail pressure at an increased level and continue to command multiple injection pulses per injection cycle and/or combustion event for a predetermined period after the injector clean signal 220 is generated. The predetermined period may be a period between 2 seconds and 10 seconds, or a period that is greater than 10 seconds. In addition, the spark control module 210 may continue to advance the spark timing for the predetermined period after the injector clean signal 220 is generated.

Figure 3:
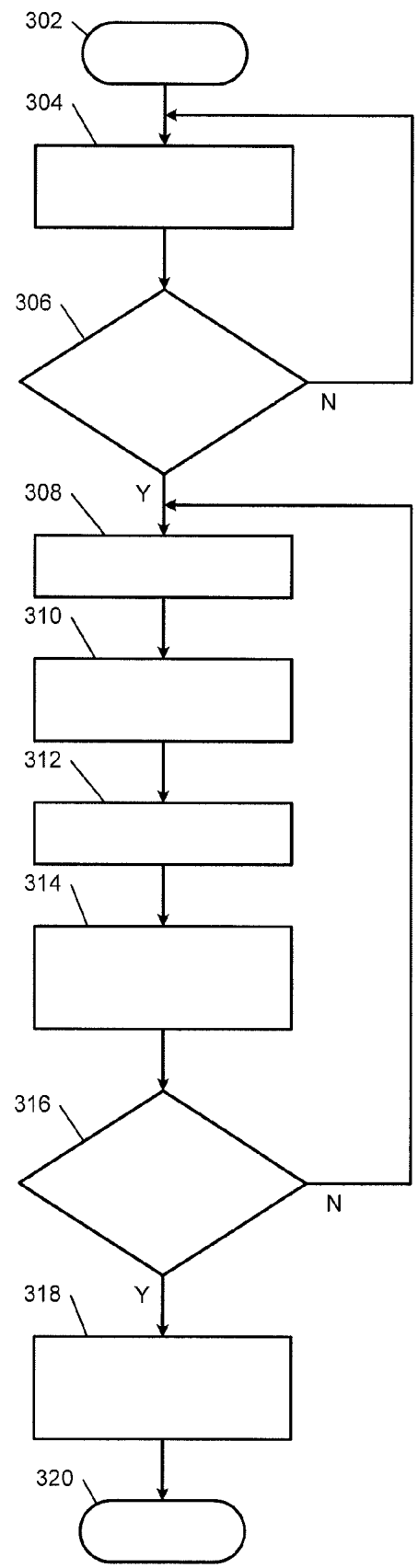
FIG. 3 is a flowchart illustrating an example control method according to the principles of the present disclosure.

Referring now to FIG. 3, a method for controlling the fuel system 160 to remove soot deposits from fuel injectors of the fuel system 160 begins at 302. The method is described in the context of the modules included in the example implementation of the ECM 114 shown in FIG. 2. However, the particular modules that perform the steps of the method may be different than those mentioned below and/or the method may be implemented apart from the modules of FIG. 2.

At 304, the DFCO module 204 and/or the fuel injector cleaning module 206 monitor engine operating conditions. The engine operating conditions may include vehicle speed, accelerator pedal position, engine runtime, and/or fuel injector flow. At 306, the DFCO module 204 and/or the fuel injector cleaning module 206 determine whether the engine operating conditions satisfy predetermined criteria.

In one example, the DFCO module 204 may determine whether the vehicle speed and the accelerator pedal position satisfy the conditions required for deceleration fuel cutoff specified above. In another example, the fuel injector cleaning module 206 may determine whether the amount of time that the engine 102 has ran since the fuel injectors of the engine 102 were last cleaned is greater than or equal to a predetermined period (e.g., 2 hours). In yet another example, the fuel injector cleaning module 206 may determine whether fuel flow through fuel injectors has decreased by a predetermined amount. In still other examples, the fuel injector cleaning module 206 may determine whether the transmission is shifting gears and/or whether the transmission is decoupled from the engine 102.

When the engine operating conditions satisfy the predetermined criteria, the method continues at 308. Otherwise, the method returns to 304. At 308, the fuel injector cleaning module 206 determines that cleaning the fuel injectors of the engine 102 is desired and therefore generates and instruction (e.g., the injector clean signal 220) to clean the fuel injectors.

At 310, the fuel control module 208 increase the pressure of fuel in the fuel rail 172 to a predetermined pressure (e.g., 35 megapascals), which may correspond to a maximum capacity of the high pressure pump 168. At 312, the spark control module 210 advances the spark timing of the engine 102. For example, due to the advanced spark timing, fuel injections into a cylinder may start between 7 degrees and 12 degrees (e.g., 10 degrees) of crankshaft rotation before spark is generated in the cylinder.

At 314, the fuel control module 208 controls the fuel injectors of the engine 102 to perform multiple (e.g., 3) ballistic pulses during each injection cycle and/or for each combustion event. As discussed above, when commanding the fuel injectors to perform ballistic pulses, the fuel control module 208 may deactivate the fuel injectors before the fuel injectors fully open and/or reactivate the fuel injectors before the fuel injectors fully close. In addition, the fuel control module 208 may decrease the pulse width of the fuel injectors and the dwell time of the fuel injectors to corresponding minimum values dictated by the capacity of the fuel injectors. For example, the fuel control module 208 may command a pulse width of 0.5 ms to 0.8 ms (e.g., 0.6 ms) for each ballistic pulse and a dwell time of 0.2 ms to 1.2 ms (e.g., 0.5 ms) between each ballistic pulse.

At 316, the fuel control module 208 determines whether a predetermined period (e.g., 2 hours) has elapsed since the instruction to clean the fuel injectors was first generated. If the predetermined has elapsed, the method continues at 318. Otherwise, the method returns to 308.

At 318, the fuel control module 208 and the spark control module 210 respectively control fuel injection and spark timing normally. For example, the fuel control module 208 may increase the pulse width to about 1.2 ms or 1.3 ms and increase the dwell time to about 3.5 ms, and the spark control module 210 may retard the spark timing. The fuel control module 208 may gradually increase the pulse width and/or the dwell time by a predetermined increment (e.g., 0.2 ms) each injection cycle.

Figure 4:
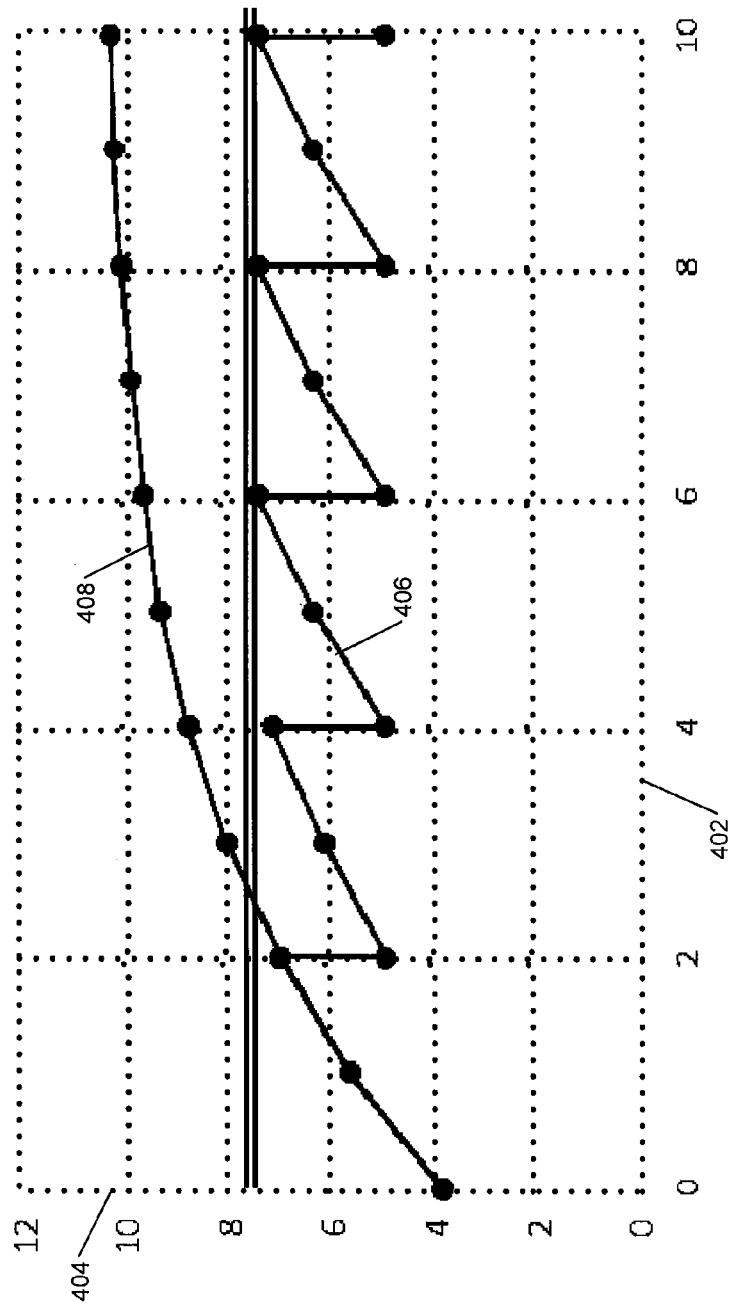
FIG. 4 is a graph illustrating the effect of an example control method according to the principles of the present disclosure on particulate emission levels.

Referring now to FIG. 4, a graph illustrates the effect of an example fuel injector cleaning method according to the principles of the present disclosure on particulate emission levels. As soot is deposited in the inlet and outlet holes of the fuel injectors of an engine, the levels of particulate emissions produced by the engine increases. Thus, the injector cleaning techniques disclosed herein reduce particulate emission levels.

An x-axis 402 represents engine runtime in hours. A y-axis 404 represents particulate emissions in particulate number per kilometer over engine hours or milligrams of particulates per kilometer over engine hours. A first particulate emissions curve 406, a second particulate emissions curve 408, and a particulate emissions upper limit 410 are plotted with respect to the x-axis 402 and the y-axis 404.

The first particulate emissions curve 406 results from operating an engine without cleaning fuel injectors of the engine according to the principles of the present disclosure. The second particulate emissions curve 408 results from operating an engine while cleaning fuel injectors of the engine according to the principles of the present disclosure. To this end, as shown in FIG. 4, the fuel injectors are cleaned every two hours of engine runtime using the fuel injector cleaning techniques disclosed herein.

At two hours of engine runtime, the first particulate emissions curve 406 and the second particulate emissions curve 408 are both approaching the particulate emissions upper limit 410. However, the first particulate emissions curve 406 decreases before crossing the particulate emissions upper limit 410 due to the fuel injector cleaning, while the second particulate emissions curve 408 crosses the particulate emissions upper limit 410. Thus, the fuel injector cleaning techniques of the present disclosure may be used to maintain particulate emission levels below a particulate emissions upper limit.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system comprising:
    a fuel injector cleaning module that generates an instruction to clean a fuel injector of an engine based on engine operating conditions; and
    a fuel control module that, in response to the injector clean instruction, controls the fuel injector to perform N fuel injections for each combustion event in a cylinder of the engine and, during each of the N fuel injections, deactivates the fuel injector before the fuel injector fully opens, wherein N is an integer greater than one.

2. The system of claim 1 wherein, during each of the N fuel injections, the fuel control module activates the fuel injector for a period between 0.5 milliseconds and 0.8 milliseconds.

3. The system of claim 1 wherein, between each of the N fuel injections, the fuel control module deactivates the fuel injector for a period between 0.2 milliseconds and 1.2 milliseconds.

4. The system of claim 1 wherein the fuel control module increases a pressure of fuel supplied to the fuel injector in response to the injector clean instruction.

5. The system of claim 4 wherein the fuel control module increases the fuel pressure to a predetermined pressure corresponding to maximum capacity of a fuel pump that supplies fuel to the fuel injector.

6. The system of claim 1 further comprising a spark control module that advances spark timing in response to the injector clean instruction.

7. The system of claim 6 wherein the spark control module advances the spark timing by controlling a spark plug to generate spark in the cylinder of the engine at a crank angle of 7 to 12 degrees after the fuel injector starts performing the N fuel injections.

8. The system of claim 1 wherein the fuel injector cleaning module generates the injector clean instruction when a vehicle propelled by the engine is at least one of decelerating and coasting.

9. The system of claim 1 wherein the fuel injector cleaning module generates the injector clean instruction at predetermined operating intervals of the engine.

10. The system of claim 1 wherein the fuel injector cleaning module generates the injector clean instruction when a rate of fuel flow through the fuel injector decreases by at least a predetermined amount.

11. The system of claim 1 wherein the fuel injector cleaning module generates the injector clean instruction when at least one of:
    a transmission is decoupled from the engine; and
    the transmission is shifting gears.

12. The system of claim 1 wherein the fuel control module continues to control the fuel injector to perform the N fuel injections for each combustion event in the cylinder for a predetermined period.

13. A method comprising:
    generating an instruction to clean a fuel injector of an engine based on engine operating conditions; and
    in response to the injector clean instruction, controlling the fuel injector to perform N fuel injections for each combustion event in a cylinder of the engine and, during each of the N fuel injections, deactivates the fuel injector before the fuel injector fully opens, wherein N is an integer greater than one.

14. The method of claim 13 further comprising, during each of the N fuel injections, activating the fuel injector for a period between 0.5 milliseconds and 0.8 milliseconds.

15. The method of claim 13 further comprising, between each of the N fuel injections, deactivating the fuel injector for a period between 0.2 milliseconds and 1.2 milliseconds.

16. The method of claim 13 further comprising increasing a pressure of fuel supplied to the fuel injector in response to the injector clean instruction.

17. The method of claim 16 further comprising increasing the fuel pressure to a predetermined pressure corresponding to maximum capacity of a fuel pump that supplies fuel to the fuel injector.

18. The method of claim 13 further comprising advancing spark timing in response to the injector clean instruction.

19. The method of claim 18 further comprising advancing the spark timing by controlling a spark plug to generate spark in the cylinder of the engine at a crank angle of 7 to 12 degrees after the fuel injector starts performing the N fuel injections.

20. The method of claim 13 further comprising generating the injector clean instruction when a vehicle propelled by the engine is at least one of decelerating and coasting.

21. The method of claim 13 further comprising generating the injector clean instruction at predetermined operating intervals of the engine.

22. The method of claim 13 further comprising generating the injector clean instruction when a rate of fuel flow through the fuel injector decreases by at least a predetermined amount.

23. The method of claim 13 further comprising generating the injector clean instruction when at least one of:
    a transmission is decoupled from the engine; and
    the transmission is shifting gears.

24. The method of claim 13 further comprising continuing to control the fuel injector to perform the N fuel injections for each combustion event in the cylinder for a predetermined period.

\* \* \* \* \*